Sept. 20, 1949.                    W. L. JENKINS                    2,482,418
              METHOD AND APPARATUS FOR PRODUCING HOLLOW
                     ARTICLES OF RUBBERY MATERIALS
Filed Aug. 6, 1946                                        2 Sheets-Sheet 1
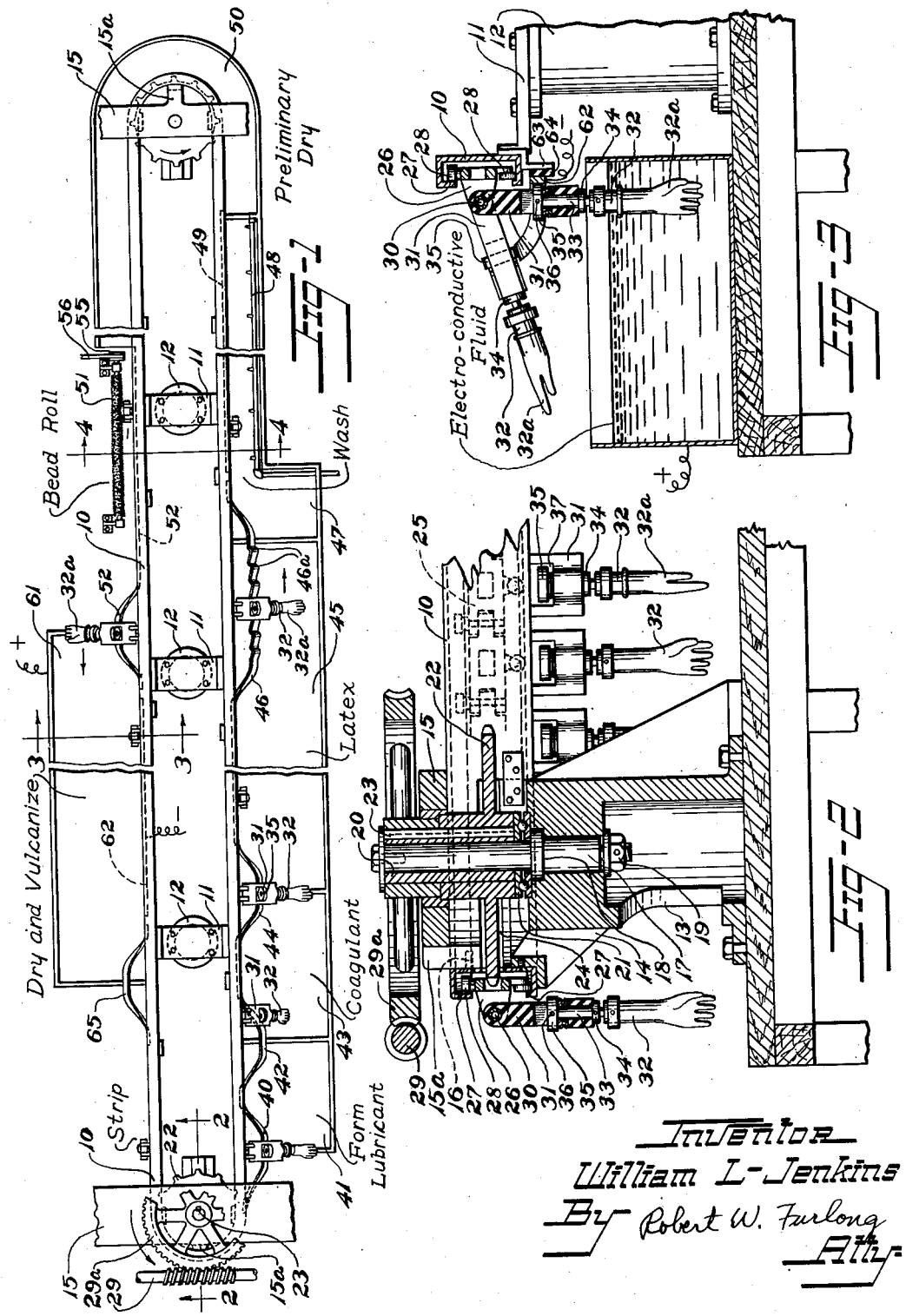
Inventor
William L. Jenkins
By Robert W. Furlong
Att'y

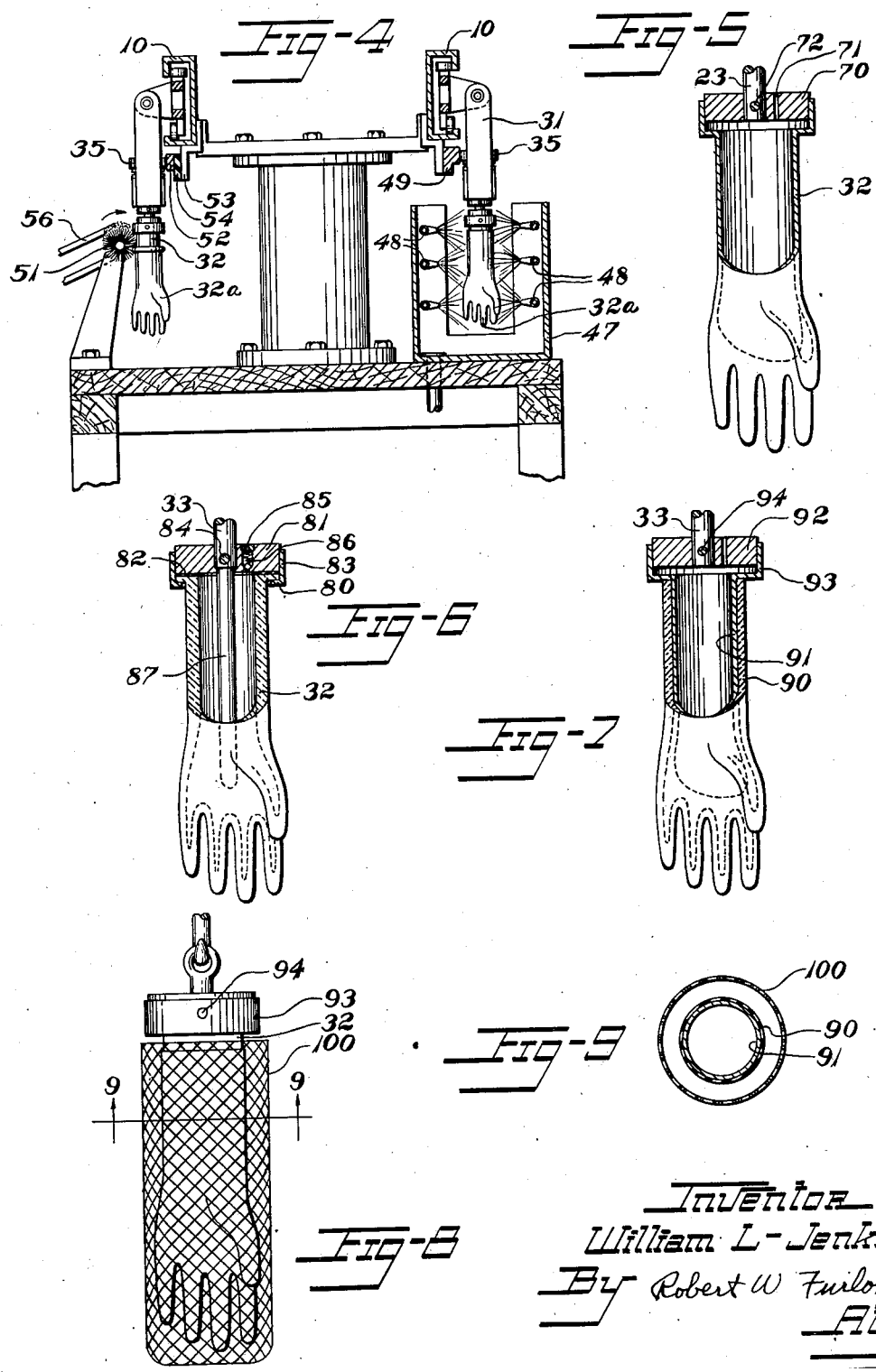

Patented Sept. 20, 1949

2,482,418

UNITED STATES PATENT OFFICE 2,482,418

METHOD AND APPARATUS FOR PRODUCING HOLLOW ARTICLES OF RUBBERY MATERIALS

William L. Jenkins, Akron, Ohio, assignor to The B. F. Goodrich Company, New York, N. Y., a corporation of New York Application August 6, 1946, Serial No. 688,593

7 Claims. (Cl. 18—24)

This invention relates to the production of articles from aqueous dispersions of rubber and other rubber-like materials. More specifically, the invention relates to improved methods and apparatus for the drying and vulcanization of deposits of latex rubber or deposits of other rubbery materials produced from aqueous dispersions thereof.

It has been proposed, heretofore, to vulcanize products shaped from solid rubber by the application of a high-frequency electrostatic field. This method of vulcanization, however, has not found application in the commercial production of dipped rubber goods, which usually have complex shapes and configurations, for difficulties have been incurred due in part, at least, to the inherent nature of latex deposits and in part to the straight-line characteristics of an electrostatic field which causes curved areas of a deposit not disposed normal to the direction of the field to be heated less strongly than areas normal to the field.

Therefore the present invention aims to provide simple, economical and efficient methods and apparatus utilizing a high-frequency electrostatic field for the drying and vulcanization of shaped hollow rubber goods produced from latex or other aqueous dispersions of rubber-like materials.

The invention also aims to provide methods and apparatus which will speed the drying and vulcanization of fresh latex deposits so as to make possible the production of hollow rubber articles of non-uniform section in a continuous manner.

I have found that a deposit of latex rubber or other rubber-like material may be vulcanized in place upon a supporting body or form adapted to function as an electrode within the deposit to apply a high-frequency alternating electrostatic field of substantially uniform characteristics to the deposit so as to incite therewithin a maximum degree of reaction to the field. I have also found that a wet, freshly formed deposit of latex rubber or other rubber-like material produced from aqueous dispersions thereof may be dried by a few minutes' exposure to a high frequency alternating electrostatic field applied to the surface substantially throughout its extent. I have further found that the best method of attaining uniform and efficient drying and vulcanization of latex coagulum deposits through the application of a uniform electrostatic field is by depositing, or otherwise associating a deposit of rubbery material with a shaped supporting or forming member, the forming portion of which comprises a body of electro-conductive material disposed interiorly thereof and uniformly with respect to the outside surface of the forming member so that an effective electrical suface of such electro-conductive material is presented to the entire inner surface of the deposit, and by associating or surrounding the deposit-covered forming member, preferably while said deposit is in the undried condition, with a second body of electro-conductive material disposed about the deposit in a manner to bring the effective electrical surface of such second body of electro-conductive material in uniform juxtaposition to the outside surface of the deposit. Thus, the two bodies of electro-conductive material are separated by a gap uniform in width but of irregular configuration so as to conform to the outlines of the deposit and to form the plates of a condenser in which the wet deposit is included as the material to be dried and vulcanized.

I have found that a preferred method of producing irregularly shaped rubber articles or articles having a generally non-uniform section, such as rubber gloves, consists in producing the latex coagulum deposit upon forms of a glazed impervious porcelain material or the like for such form-material imparts a smooth inner surface to such deposits but, unfortunately, is non-conductive in character. In order to render such glove forms capable of functioning properly as an electrode, it is preferred to design the forms so as to possess a cavity with a uniform wall thickness so that the inside surface of the cavity will closely conform to the configuration of the outside surface. The cavity may then be filled with an electro-conductive material such as a fluid material which will flow into and assume the shape of the cavity, thus locating the effective electrical face of such electro-conductive material at the interface between the dielectric porcelain material and the fluid electro-conductive material. Among the fluid electro-conductive materials which may be used are aqueous solutions of electrolytes, low melting molten metals or alloys, such as molten Wood's metal, molten salts or mixtures of salts, and the like. The forming and supporting member may also comprise a hollow form of glazed porcelain material similar to that described above but reinforced with a metal liner or core which serves as the electrode and which is fitted closely within the cavity so as to bring the effective electrode face at the metal-porcelain interface. An all-metal forming member, preferably of aluminum or other highly conductive material, may be used with advantage when a smooth polished surface is not essential on the inside surface of the deposit.

I have found that the outside electrode may be located so as to produce the electrostatic field substantially normal to the surface of the deposit throughout its extent by immersing the deposit-covered form containing the inner electrode in a bath of fluid electro-conductive material such as a bath of a molten low-melting salt, a bath of molten Wood's metal, or an agitated bath of high boiling organic liquid containing therein suspended particles of electro-conductive material such as graphite. If it is not desired to dry the deposit before or during vulcanization, the apparatus may embody an outer electrode comprising a bath of water containing an electrolyte such as sulfuric acid, sodium chloride, or the like. It is preferred, however, to employ as the outer electrode a non-aqueous or anhydrous liquid electro-conductive material. The outer electrode may also comprise a surrounding metal form of a size and shape to permit its being fitted closely about configurations of the form and deposit.

In the production of hollow dipped rubber goods from aqueous dispersions of rubber-like material by the methods of the prior art, the drying step often has consumed as much as 8 hours for a deposit of 0.016 inch thickness, and, of course, much greater drying times are required for thicker deposits. The vulcanization step is also time-consuming as may be seen from the fact that vulcanization in steam, hot air, or hot water commonly takes one hour or more at temperatures of 250° F. or more. Thus, it can be seen that the drying and vulcanization steps consume sufficient time to confine the production of dipped rubber goods to a stepwise method. With the methods and apparatus outlined herein the speed of production may be increased so that a continuous process is feasible from which great savings in time, labor and cost of equipment are realized as well as a significant improvement in product quality.

The invention will be described with further reference to several specific embodiments as shown in the accompanying drawings, of which:

Fig. 1 is a plan view of an apparatus for the continuous production of surgeon's gloves or household-type rubber gloves, the view showing a chain actuated glove form conveyor along which are disposed, as indicated by legends, stations for dipping, washing, preliminary drying, bead rolling, final drying and vulcanization, and stripping.

Fig. 2 is an enlarged sectional view taken along the line 2—2 of Fig. 1 showing a number of dipping forms at the stripping station one of the forms having thereover a finished glove deposit ready for stripping.

Fig. 3 is an enlarged sectional view taken along the line 3—3 of Fig. 1.

Fig. 4 is an enlarged sectional view taken along the line 4—4 of Fig. 1.

Fig. 5 is an enlarged elevational view with portions broken away and in section showing a metal forming member or glove-shaped electrode which may be used in conjunction with the apparatus of Fig. 1 to form and vulcanize glove-shaped deposits of rubbery materials.

Fig. 6 is an enlarged elevational view with portions broken away and in section showing another embodiment of a forming member which may be used in conjunction with the apparatus of Fig. 1 to produce rubber gloves and having portions broken away and in section to show the glazed porcelain material of the outer portion of the form and showing in dotted lines the extent of the cavity therein in which the electro-conductive fluid material of the inner electrode may be disposed.

Fig. 7 is an enlarged elevational view similar to Figs. 5 and 6 showing a third illustrative forming member with portions partially broken away and in section to disclose the glazed porcelain material of the outer portion of the form and a glove-like metal liner or core within the otherwise cavitied porcelain form to serve as an inner electrode.

Fig. 8 is an elevational view of a second embodiment of apparatus for the production of vulcanized rubbery deposits showing a glove-like forming member (as in Figs. 5, 6 and 7) surrounded with a metal wire grid outer electrode.

Fig. 9 is a sectional view taken along the line 9—9 of Fig. 8.

Referring to the drawings, Figs. 1 to 4 show a preferred form of apparatus for the continuous production of hollow rubber articles such as rubber gloves. The apparatus comprises a continuous channel rail track 10 hung on three cross plates 11, 11 bolted to the tops of three center support posts 12, 12 and supported on two end support posts 13, 13 by means of brackets 14, 14 and top plates 15, 15. The top plates 15, 15 have projections 15a, 15a which extend outward and downward so that the channel rail 10 may be secured thereto as by stud bolts 16, 16. The two end support posts 13, 13 each have vertical non-rotating shafts 17, 17 supported therein on thrust collars 18, 18 and secured against vertical movement by lock nuts 19, 19. The non-rotating shafts 17, 17 are fitted within freely rotatable sleeves 20, 20 which are in turn supported on ball thrust bearings 21, 21. Sprocket wheels 22, 22 are secured to the sleeves 20, 20 by means of keys 23, 23. The sprocket wheels 22, 22 rotate in a slot 24 in the channel rail 10 so that a conveyor chain 25 traveling over the sprocket wheels will be carried within the channel rail 10. The chain 25 carries a plurality of form hanger brackets 26, 26 disposed between the connecting links of the chain 25; the brackets 26, 26 traveling along within the channel rail 10 and being supported against the vertical sides 27, 27 of the C-shaped cross section of the channel rail by traveling guide wheels 28, 28 on the hanger brackets 26, 26. The conveyor chain 25 is advanced around the channel rail 10 by a worm gear drive 29, the gear 29a of the worm gear drive 29 being secured to the sleeve 20 by means of the key 23.

The hanger brackets 26, 26 have holes 30, 30 at the outer edge of the bracket from which are hung form holder arms 31, 31 which rotatably support dipping or forming members 32, 32. The forming members or dipping forms 32, 32 are journalled in the form holders 31, 31 on shafts 33, 33 which are provided at the bottom with thrust collars 34, 34 and at the top with friction drive wheels 35, 35 which are pinned to the shafts 33, 33 by pins 36, 36 and rotate in openings 37, 37 in the form holder arms 31, 31. The friction drive wheels 35, 35 make contact with a succession of curved raise and lower guide bars which are disposed below the channel rail 10 in a manner to lift the forms 32, 32 out and sidewards substantially to the horizontal position in order to raise the forms over the edges of a succession of tanks in the course of their travel around the channel rail 10.

The dipping form 32 is first raised by the guide bar 40 over the edge of a tank 41 containing a solution of a form lubricant, the form 32 hanging in the vertical position during the short distance of travel in the tank. The form 32 then is raised over the other wall of tank 41 by a second guide bar 42 and lowered into a tank 43 of a coagulant for aqueous dispersions. Similarly, the guide bar 44 raises the form 32 and lowers it into a third tank 45 of latex or other aqueous dispersion of rubbery material. After a period of travel in the latex tank 45 (the break in the apparatus indicated in the latex tank of Fig. 1 is to indicate that the latex tank 45 may be made of proper length to conform to the requirements of the type of latex composition being used and particularly to provide the required time of immersion to produce the thickness of deposit desired). The guide bar 46 raises the form 32 out of tank 45 and due to the teeth-like corrugations 46a, 46a in the bar 46 the form 32 will be shaken and vibrated in order to break the film of latex which frequently bridges the gap between the fingers of dipping forms when they are being lifted from latex. After being lowered to the vertical position by the guide bar 46 the form 32 passes between the constricted sides of wash tank 47 which is provided with two batteries of water nozzles or sprays 48, 48 which wash the latex deposits adhering to the form 32 to remove the small quantity of uncoagulated latex or dispersion thereon and to effect further "setting" of the deposit. As the form 32 passes between the constricted sides of the wash tank 47 the friction drive wheel 35 makes contact with a guiding bracket 49 so that the form 32 is rotated between the nozzles 48, 48. It is to be noted that the wash tank 47 in Fig. 1 is broken to indicate that the length of the wash tank will depend on the characteristics of the latex composition being used.

From the wash tank 47 the form 32, still hanging in the vertical position, enters a hot-air oven 50 for a preliminary drying period during which the surface moisture is removed from the latex deposit and the surface of the rubbery material is rendered slightly tacky so that a bead may be rolled at the wrist portion of the glove. From the air oven 50, the form, still hanging in the vertical position, enters a bead-rolling station where an elongated driven brush 51 rotates against the wrist portion of the form 32, as shown more clearly in Fig. 4, so as to press the form 32 against a guide bar 52 supported at the bottom of the channel rail 10 by a bracket 53. The guide bar 52 should preferably be insulated from the channel rail 10 by a strip of insulating material 54 such as asbestos board, Bakelite, hard rubber and the like for reasons which will later appear. The brush 51 is inclined longitudinally so as to gather a bead and roll it down the form a distance equal to the difference in height between the two ends of the brush 51. As the brush 51 presses against the form 32, the friction drive wheel 35 is rotated against guide bar 52 so that the form is rotated causing a continuous bead to be rolled on the glove deposit around the circumference of the wrist portion of the form. Rotation of the brush 51 is effected by a pulley 55 on one end of the brush 51, the pulley being driven by a V-belt 56 driving from any convenient source of motive power (not shown).

After leaving the bead-rolling brush, the form 32 is lifted by the guide bar 52 over the edge of a vulcanizer tank 61 which is filled with an electro-conductive fluid material. The form 32 travels substantially the full length of the tank 61 hanging in a substantially vertical position with the friction drive wheel 35 resting against a bus bar 62 which is connected to a source of high-frequency alternating current (not shown). The bus bar 62 is supported from the channel rail 10 by a bracket 63 which is insulated from the electrified bus bar or guide bar 62 by a strip 64 of insulating material such as hard rubber, asbestos board, Bakelite, or other suitable material. The tank 61 is connected to the other terminal of the same source of high-frequency current as the bus bar 62 so as to conduct the high frequency current to the electro-conductive material therein.

The high-frequency alternating current circuit is completed from the electrified bus bar 62 through the friction drive wheel 35, thence through the form support shafts 33 to the form itself and then through the latex deposit to the fluid material in the tank 61. The form 32 is insulated from the form hanger bracket 26 and from the rest of the apparatus since the form holder arms 31, 31 are made of insulating material such as wood, molded Bakelite, molded asbestos composition or molded hard rubber or others.

The form 32 is lifted from the vulcanizer tank 61 by a curved guide bar 65 and the gloves may then be talced on the outside and stripped from the form either by hand or by a mechanical stripping machine disposed along the conveyor after the vulcanizer tank 61.

The drawings disclose a number of embodiments of dipping and supporting forms which may be used interchangeably on the conveyor apparatus described above. Fig. 5 shows an all-metal form 32 which is semi-hollow (for reducing the weight) and having solid metal finger sections. The form is provided at the top with a cover 70 having a vent hole 71, the cover 70 being secured within the flared top rim of the form by a pin 72 passing through the rim of the form, through the cover 70 and through the form support shaft 33. This particular type of form is preferably made of aluminum because of its lightness and because aluminum is relatively inert with respect to its effects on rubber. However, steel and other metals may also be used as a material of construction in making all-metal forms.

Fig. 6 discloses an impervious, glazed porcelain form which is hollow a considerable distance into the finger sections. This form may be filled with an electro-conductive material either fluid or solid in nature which material may be induced to substantially fill the cavity of the form so as to be in intimate contact with the inside surface of the form. The all-porcelain form 32 is provided with an integral rim 80 upon which the cover 81 may be seated with a sealing gasket 82 interposed therebetween. The cover 81 is secured to the rim 80 by a crimped ferrule 83 which is further secured to the rim 80 by a pin 84 passing through the ferrule 83, cover 81 and hanger shaft 33. Since the cavity of the form 32 is to be filled with a fluid or other electro-conductive material, the cover 81 is provided with a vent hole 85. To prevent escape of fluid from the form 32 when it is lifted to the near horizontal position in passing from one tank to another, the vent hole 85 is provided with a spring loaded ball check valve 86 or similar device. In order that electrical contact be made with the fluid contained in the form cavity, the hanger shaft 33 is provided with an extension 87 extending down into the form cavity.

Fig. 7 discloses a further modification of dipping form which may be used in conjunction with the glove-making apparatus of Fig. 1, the form having a glazed, impervious porcelain outer shell 90 and a metal core 91 inside the porcelain, the metal core 91 extending down part way into the finger portions. A vented cover 92 is fitted within a flared rim portion 93 of the metal core 91 and secured by means of a pin 94 passing through the rim 93, the cover 92 and the hanger shaft 33.

In the apparatus of Fig. 1 the drying and vulcanizing station may be modified by omitting the electro-conductive fluid material and passing the rotating electrified forms between the electrified walls of the tank. (It would be preferable in this case if the walls were placed closer together for this purpose than they appear in the drawings.) Another modification of the drying and vulcanizing tank is shown in Fig. 8. The forms 32, 32 moving into the drying and vulcanizing station may be surrounded with a wire grid outer electrode 100, the grid being of a basket-like cylindrical shape similar to the form so as to impress a field substantially normal to the deposit. Any of the glove forms shown in the accompanying drawings may be used with the wire grid outer electrode of Fig. 8. (The form shown in the sectional view of Fig. 9 being the form shown in Fig. 7 having a porcelain outer shell 90 and an inner metal liner 91.)

In operation of the apparatus of Fig. 1 the conveyor system advances the forms 32 through a succession of dipping steps through the vulcanization station to the talcing and stripping stations. The forms are first immersed for a time sufficient to wet the form in a tank 41 containing a dispersion in a volatile solvent of a form lubricant such as talc or soapstone in alcohol or acetone; the form drying very quickly while it is being advanced to the next station where it is immersed in tank 43 containing a volatile solution of a coagulant for aqueous dispersions of rubbery materials; coagulants such as any of the salts of the polyvalent metals such as calcium nitrate dissolved in alcohol and acetone or acetic acid or others may be used. The form again dries while it is being advanced to the tank 45 containing rubber latex or other aqueous dispersions of rubbery materials. The time of immersion in latex will vary according to the thickness of deposit desired and the composition of the coagulant solution. It has been found that an immersion time of one and one-half minutes will produce a coherent deposit 32a of neoprene (polychloroprene) of substantially uniform thickness throughout (approximately 0.012 to 0.016 inch in thickness when dried). The deposit-covered forms then enter the washing tank where water sprays 48, 48 remove non-coagulated latex from the outside surface of the deposit and the residual coagulant from exposed areas of the forming member in order to prevent deterioration of the rubber and to minimize danger of arcing of the high-frequency current in the subsequent electronic vulcanization step. From the washing station the forms move to an air oven 50 for a preliminary drying at 150–250° F. to remove surface moisture and to render the surface slightly tacky in order to facilitate the subsequent bead-rolling step.

From the air oven, the forms pass between the rotating brush 51 of the bead-rolling machine and the guide bar 52, the forms rotating so as to form a continuous bead around the wrist portion of the glove form. From the bead-rolling station the forms advance to the vulcanizer tank. The deposit-covered forms are immersed in the electro-conductive fluid material and at the same time make contact with the bus bar thereby establishing a high-frequency electrostatic field generally normal to the deposit on the form. Upon exposure to the high-frequency current the deposit of coagulum is at first so highly conductive (due to the presence of coagulant diffused through the water phase of the coagulum) that a current flows through the coagulum. The flow of current is sufficient to result in considerable resistance heating. After the deposit has been heated by resistance to the current flow and by the effects of the electrostatic field the water is driven from the deposit into the electro-conductive fluid in the vulcanizer tank, which will usually be at a temperature above the boiling point of water so as to vaporize the moisture driven from the deposit and drive it off into the atmosphere as steam.

Under the usual operating conditions the deposit must be heated to at least 180 to 212° F. in order to speedily expel the water. Until the deposit is substantially dry its temperature will not rise substantially above 212° F., but when dry, the temperature of the deposit will rise to 250 to 300° F. or more at which temperatures a deposit from the usual latex compositions may be speedily vulcanized since the electrostatic field has an accelerating effect on the vulcanization reaction. At the start of the drying cycle the voltage across the deposit will be low due to the heavy current induced in the circuit by the high conductance of the wet deposit. When the deposit is substantially dry the voltage rises and the current flow is reduced. The drying stage has been found to take from 3 or 5 to 10 or 15 minutes or more, depending on the power input, the thickness and size of the deposit, and its water content.

During the final stage of the exposure of the deposit to the effects of the high-frequency electrostatic field, vulcanization of the dried deposit takes place. In this latter stage care should be taken to adjust the power input so as to keep the temperature of the dried deposit preferably at from 250 to 325° F. for if the temperature rises substantially above 325° F. the rubber is apt to burn, and "blow" or become spongy and cellular in nature. In contrast with the drying of the deposit, the vulcanization of the deposit will be complete in from one to three minutes or slightly more (depending on the power input, the type of chemical vulcanization accelerator employed in the latex composition, and the quantity of electronically active compounding ingredients, such as carbon black and metallic oxides present in the latex composition).

The method hereinabove outlined produces a smooth thin glove of a strength as high as or higher than the best gloves produced by conventional air, steam or hot water drying and vulcanization methods. For instance, a glove produced by the method of this invention from a latex of neoprene (a polychloroprene type of synthetic rubber) with a thickness of 0.012 to 0.016 inches will exhibit a tensile strength of 3000 to 3100 p. s. i. A glove produced from the same latex by conventional methods usually exhibits a tensile strength of 2900 to 3000 p. s. i.

The method of this invention produces gloves much more cheaply and efficiently than previously known methods and there are realized great savings in time and labor as well as a great saving in floor space by the elimination of conventional air ovens and the bulky racks and trucks usually needed for the many hand-operations involved in prior methods and apparatus.

Rubber or other rubber-like materials which may be used in the manufacture of gloves or other hollow dipped rubber goods by the method of this invention include aqueous dispersions of natural rubbers such as hevea, balata, and others, and synthetic rubbers and reclaimed rubbers. The synthetic rubbers which may be used include, without being limited to, polymers of the conjugated diene hydrocarbons such as butadiene-1,3 and its homologs, with such copolymerizable monomeric materials as styrene, acrylonitrile, methyl acrylate, methyl methacrylate and others, and polymers of 2-chlorobutadiene-1,3 either alone or with monomeric materials copolymerizable therewith. The aqueous dispersions may either be naturally occurring or artificially prepared by any of the known methods.

Any appropriate source of high-frequency oscillating or alternating currents may be employed and the frequency of the current may vary widely as is understood in the art. Generally, however, the frequency will be greater than about one million cycles per second (one megacycle) and may be as high as a hundred, two hundred or three hundred million cycles per second (100, 200 or 300 megacycles) or more. Voltages, power input, and the like also will be varied and controlled in the usual way, the details of which are well understood and form no part of the present invention.

While the invention has been described with particular reference to certain preferred embodiments thereof, it is possible to make variations and modifications therein without departing from the spirit and scope of the invention as defined in the appended claims.

I claim:

1. In the manufacture of shaped hollow articles of rubber-like materials, the method which comprises associating a shaped hollow deposit of coherent coagulum comprising rubber-like material having an aqueous phase with a water-impervious hollow non-conductive supporting body of irregular shape having electro-conductive material disposed interiorly of said body in a position that the electro-conductive material presents a surface substantially conforming to the outlines of said supporting body throughout its extent, immersing the said body and deposit thereon in a bath of fluid non-aqueous electro-conductive material, said fluid material being in direct contact with said deposit, applying a high-frequency alternating current to said body and bath as electrodes until the deposit has been dried and vulcanized to a substantial extent, and thereafter removing the deposit from the said body.

2. The method of manufacturing latex dipped articles which comprises progressively moving a series of stations a plurality of forms through of water-impervious dielectric material, each being of irregular shape and having a hollow interior conforming generally to the exterior shape thereof so that the wall thickness of said forms is substantially uniform throughout its extent and, in the course of the progressive movement, depositing latex coagulum on one surface of each of said forms in succession by a dipping operation, successively immersing said forms and deposits of coagulum in a bath of non-aqueous electro-conductive liquid, disposing an electro-conductive liquid in the hollow interiors of said forms, establishing a high-frequency alternating electrostatic field between said liquids, to dry and vulcanize said deposits of coagulum and thereafter removing the deposits from the forms.

3. The method which comprises disposing a fresh deposit of coagulum comprising vulcanizable rubber-like material and having an aqueous phase upon the surface of an irregularly shaped glazed porcelain form, disposing the coagulum-coated surface of said form in contact with an electrode comprising an electro-conductive liquid, disposing a second electrode on the opposite side of said coagulum from said liquid, said second electrode having a surface substantially coextensive with said coagulum but separated therefrom by said form, and establishing an alternating electrostatic field having a frequency of at least one megacycle between said electrodes to vulcanize said coagulum.

4. The method of making an irregularly shaped hollow article of rubber-like material which comprises depositing a coagulum comprising a vulcanizable rubber-like material upon the outer surface of a suitably shaped hollow glazed porcelain form, immersing the coagulum-coated surface of said form in an electrode comprising a body of anhydrous electro-conductive liquid material, disposing a second electrode within said form, said second electrode having a surface substantially coextensive with said coagulum but separated therefrom by the wall of said form, and establishing an alternating electrostatic field having a frequency greater than one megacycle between said electrodes to dry and vulcanize said coagulum.

5. In the manufacture of irregularly shaped hollow articles of rubber-like material, the steps which comprise providing a suitably shaped water-impervious form of non-conductive material, said form being hollowed out to provide an interior surface substantially conforming to the shape of the exterior surface thereof throughout its extent and having an electro-conductive material disposed adjacent said interior surface to provide an internal electrode, depositing a layer of water-containing coagulum comprising rubber-like material upon the exterior surface of said coagulum-coated exterior form, disposing said surface in contact with a body of non-aqueous electro-conductive liquid material, and establishing an alternating electrostatic field having a frequency greater than one megacycle between said internal electrode and said body of liquid to dry said layer of coagulum.

6. In an apparatus for the manufacture of latex dipped goods by deposition of a layer of wet coagulum comprising vulcanizable rubber-like material upon the surface of a hollow glazed porcelain form, heating means for drying and vulcanizing said layer of coagulum on said form comprising a body of non-aqueous electro-conductive liquid material adapted to serve as an external electrode, a body of electro-conductive material within said hollow form adapted to serve as an internal electrode, said internal electrode being uniformly disposed with respect to the outer surface of said form, and means for establishing an alternating electrostatic field having a frequency greater than one megacycle between said electrodes to dry and vulcanize said layer of coagulum upon said form.

7. Apparatus for the manufacture of latex dipped goods of irregular configuration comprising a body of non-aqueous electro-conductive liquid material adapted to serve as an external electrode, a suitably shaped hollow glazed porcelain form adapted to support a fresh deposit of latex coagulum comprising vulcanizable rubber-like material upon its outer surface, said form having an interior surface substantially conforming to the shape of the exterior surface thereof throughout its extent, a body of electro-conductive material disposed adjacent said interior surface and coextensive therewith adapted to serve as an internal electrode, means for immersing said coagulum-coated form in said external electrode, and means for establishing an alternating electrostatic field having a frequency greater than one megacycle between said electrodes.

WILLIAM L. JENKINS.

REFERENCES CITED

The following references are of record in the file of this patent:

UNITED STATES PATENTS

| Number | Name | Date |
|---|---|---|
| 2,021,299 | Gammeter | Nov. 19, 1935 |
| 2,041,788 | Sprunger | May 26, 1936 |
| 2,261,847 | Dufour et al. | Nov. 4, 1941 |
| 2,298,037 | Crandell | Oct. 6, 1942 |
| 2,299,269 | Gammeter | Oct. 20, 1942 |
| 2,333,143 | Bennett | Nov. 2, 1943 |
| 2,395,920 | Grotenhuis | Mar. 5, 1946 |

Certificate of Correction

Patent No. 2,482,418                                                     September 20, 1949

WILLIAM L. JENKINS

It is hereby certified that errors appear in the printed specification of the above numbered patent requiring correction as follows:

Column 10, line 3, after the word "liquids" strike out the comma and insert the same in line 4, after "coagulum"; column 12, list of references cited, after line 14, insert the following:

FOREIGN PATENTS

| Number | Country | Date |
|---|---|---|
| 477,911 | Great Britain | Jan. 10, 1938 | and that the said Letters Patent should be read with these corrections therein that the same may conform to the record of the case in the Patent Office.

Signed and sealed this 11th day of July, A. D. 1950.

[SEAL]

THOMAS F. MURPHY,
*Assistant Commissioner of Patents.*